United States Patent
Montelisciani et al.

(10) Patent No.: US 10,452,364 B2
(45) Date of Patent: Oct. 22, 2019

(54) METHOD AND SYSTEM FOR PREPARING CODE TO BE EXECUTED BY PROGRAMMABLE CONTROL DEVICES

(71) Applicant: Kinzica Ventures LLC, New York, NY (US)

(72) Inventors: Gabriele Montelisciani, San Giuliano Terme (IT); Daniele Mazzei, Pisa (IT); Gualtiero Fantoni, Pisa (IT); Giacomo Baldi, Calci (IT)

(73) Assignee: TOI S.R.L., Pisa (IT)

( * ) Notice: Subject to any disclaimer, the term of this patent is extended or adjusted under 35 U.S.C. 154(b) by 0 days.

(21) Appl. No.: 15/736,886

(22) PCT Filed: Jun. 22, 2016

(86) PCT No.: PCT/EP2016/025066
§ 371 (c)(1),
(2) Date: Dec. 15, 2017

(87) PCT Pub. No.: WO2016/206818
PCT Pub. Date: Dec. 29, 2016

(65) Prior Publication Data
US 2018/0364991 A1    Dec. 20, 2018

(30) Foreign Application Priority Data
Jun. 24, 2015 (IT) ................ 102015000026 918

(51) Int. Cl.
*G06F 8/41* (2018.01)
*G06F 9/445* (2018.01)
(Continued)

(52) U.S. Cl.
CPC ............ *G06F 8/41* (2013.01); *G06F 8/311* (2013.01); *G06F 9/44521* (2013.01);
(Continued)

(58) Field of Classification Search
CPC ......... G06F 8/41; G06F 8/311; G06F 9/45533
See application file for complete search history.

(56) References Cited

U.S. PATENT DOCUMENTS 7,017,004 B1    3/2006  Calligaro et al.
2006/0129794 A1*  6/2006  Rudelic ............... G06F 8/65
                                                    713/2
(Continued)

OTHER PUBLICATIONS

International Search Report dated Oct. 25, 2016 for PCT/EP2016/025066.
(Continued)

*Primary Examiner* — Wei Y Zhen
*Assistant Examiner* — Amir Soltanzadeh
(74) *Attorney, Agent, or Firm* — Woodard, Emhardt, Henry, Reeves & Wagner, LLP

(57) ABSTRACT

Method for defining a code to be executed by programmable control devices comprising: —providing a programming language; —providing a code written in that programming language; —compiling such code in machine language; —transferring said machine language code on a program memory for its execution by the control device, wherein said machine language code is divided into core code and application code, said application code being loaded into the program memory regardless of the core code, without performing a linking operation of the two codes before said transfer. A corresponding system is also disclosed.

14 Claims, 7 Drawing Sheets

(51) Int. Cl.
 *G06F 8/30* (2018.01)
 *G06F 9/455* (2018.01)
(52) U.S. Cl.
 CPC ...... *G06F 9/44526* (2013.01); *G06F 9/44557* (2013.01); *G06F 9/45533* (2013.01)

(56) References Cited

U.S. PATENT DOCUMENTS

| | | | | |
|---|---|---|---|---|
| 2012/0311555 A1* | 12/2012 | Nijenkamp | ............... | G06F 8/65 717/170 |
| 2013/0054807 A1* | 2/2013 | Sherwood | ........... | H04L 67/1095 709/226 |
| 2016/0246620 A1* | 8/2016 | Wang | .................. | G06F 9/44521 |

OTHER PUBLICATIONS

Molecule: An adaptive dynamic reconfirmation scheme for sensor operating systems. Yi; Min, Cho, Hong. Science Direct, Computer Communications 31 (2008) 699-707.
Run-Time Dynamic Linking for Reprogramming wireless Sensor Networks, SenSys '06, Nov. 1-3, 2006, Boulder, Colorado USA.

* cited by examiner

400

| Symbol | Position in ROM |
|---|---|
| Function 0 (F0) | Position 0 (P0) |
| Function 1 (F1) | Position 1 (P1) |
| Function 2 (F2) | Position 2 (P2) |
| Function n (Fn) | Position n (Pn) |

401 → Function 0 row

402 → Functions 1 through n

Fig. 5

METHOD AND SYSTEM FOR PREPARING CODE TO BE EXECUTED BY PROGRAMMABLE CONTROL DEVICES

FIELD OF THE INVENTION

The present invention is directed to methods and systems for preparing and transferring code to a memory of a programmable control device, particularly a non-volatile memory image representing ROM of a device hosting a virtual machine (VM).

STATE OF THE ART

Microcontrollers are electronic devices integrated on a single chip. Their principle of operation is common to the microprocessors, which are differentiated by the fact of having on board the memory elements and the interface devices required for the digital control specific applications mostly in embedded systems that include sensors and actuators for most varied purposes.

Microcontrollers, as well as microprocessors, need to be programmed, i.e. equipped, internally or on an external memory, with binary language code providing the sequence of instructions that each device must perform during its operation.

In order to set-up the microcontroller functional program it is possible to use low-level programming languages like assembler as well as languages of slightly higher level such as C/C++. Both these programming solutions are closely related and linked to the hardware characteristics of the microcontroller and the board where it is slotted. They are, namely, single-platform programming solutions.

Alternatively, there are systems that allow the usage of high-level languages (e.g. Python) to abstract the specific microcontroller board to be programmed. These system enable a cross-platform structure able to reuse or supplement the developed code on different boards, in the form of scripts to compile and link with additional modules, libraries, as well as low level drivers to build the binary code to be transferred on the program memory.

A very efficient multi-platform system to achieve the above mentioned functionalities is a solution that makes use of a Python 3.4 subset to make highly powerful architectures for embedded systems. FIG. 1 shows an example of such an architecture. The IDE (Integrated development environment) runs on Windows platform, Linux or Mac. It includes a number of development tools shown at the top of the figure ("Tools and IDE"), in particular an Editor and Bytecode Compiler, which allow to build Python scripts (Programs) and "Modules" for the management of drivers, sensors, actuators present on a board, shown in the figure with the "Hardware" designation, using a generic applications library ("Applications").

For each hardware architecture (Microprocessor+peripherals) a Virtual Machine (VM) is set and copied to the on-board program flash along with the real time operating system (RTOS) and the low-level specific codes for the present microcontroller and peripherals (Hardware Abstraction Layer—HAL).

The real time operating system along with the low-level codes represent the core that interprets Python scripts compiled as bytecodes.

The C language compiled codes are translated into machine instructions immediately readable by the controller without the need to be interpreted by the virtual machine.

The operation that allows to develop the executable code, defined "linking", allows the various modules to be assembled together in order to become a unique code with a very specific memory allocation.

The linking operation is present both in high-level and low level languages, and it represents the final phase of a code development process before it is transferred to the program memory that will be executed by the microcontroller.

This is a highly inefficient process because it must be replicated whenever a single part of the program is modified, entailing a scratch transfer of the entire machine code.

Document U.S. Pat. No. 7,017,004 discloses a system for upgrading a non-volatile memory image by partitioning the memory into a plurality of regions that can be directly overwritten without having to overwrite the whole memory. This system, however, still requires linking the modules either statically or dynamically. In the former case, all drivers, also those unused, need always to be loaded in the memory thus leading to a waste of memory. In the latter case, a dynamic code is generated that requires a symbol resolution mechanism at runtime thus leading to a waste of time.

SUMMARY OF THE INVENTION

It is thus an object of the present invention to provide a method and system for high-level programming of microcontroller/microprocessor boards which allows to optimize the lead time needed to transfer the machine language code in the program memory for its execution, memory occupation and runtime speed.

In accordance with embodiments herein, systems, computer program products and computer implemented methods are provided for the preparation of code to be executed by programmable control devices, the systems, program products and methods comprising, under control of one or more computer systems configured with specific executable instructions:
  providing a programming language;
  providing a code written in that programming language;
  compiling such code in machine language;
  transferring said machine language code on a program memory for its execution by the control device,
  wherein said machine language code is divided into core code and application code, said application code being loaded into the program memory regardless of the core code, without performing a linking operation of the two codes before said transfer.

In practice, the link operation is performed at the time of the upload of the binary code rather than in the previous phase as commonly occurs in the systems according to the prior art. All thanks to the use of an allocation memory that keeps track of the lengths of the code as well as of the beginning and end of each module to be loaded so that the core does not need to be reloaded every time as well as the modules not subject to changes.

This is particularly advantageous in case of use of high-level programming languages.

Embodiments also relate to systems for transferring a compiled application code to a memory for being executed by a programmable control device, the system comprising:
  a virtual machine hosted by the device to run a core code loaded into the program memory independently of the application code;
  a so-called uplinker component for transferring the application code into the memory of the device;

a communication link between the virtual machine and the uplinker;

wherein the virtual machine is configured to:
send the uplinker the symbol table and desired memory size and position for the application code;
receive from the uplinker the code to be stored;
store the code as received in the memory, the uplinker being configured to:
resolve missing symbols based on the symbol table received from the virtual machine;
pack the application code according to memory size and position as communicated by the virtual machine;
send the application code to the virtual machine for being stored in the memory.

Embodiments also relate to a control system comprising:
a programmable control device;
a configurable memory device containing software that, when executed by the control device, causes the software content in the memory to be at least partially overwritten by a software received from an uplinker component configured to transfer only those parts of the software needed for a specific application with symbols resolved based on information exchanged between the control device and the uplinker component.

Further characteristics and improvements are object of the subclaims.

The characteristics of the invention and the advantages derived therefrom will appear more clearly from the following detailed description of the accompanying figures.

BRIEF DESCRIPTION OF THE DRAWINGS

FIG. 5 shows a symbol table.

DETAILED DESCRIPTION OF A PREFERRED EMBODIMENT

Figure 1:
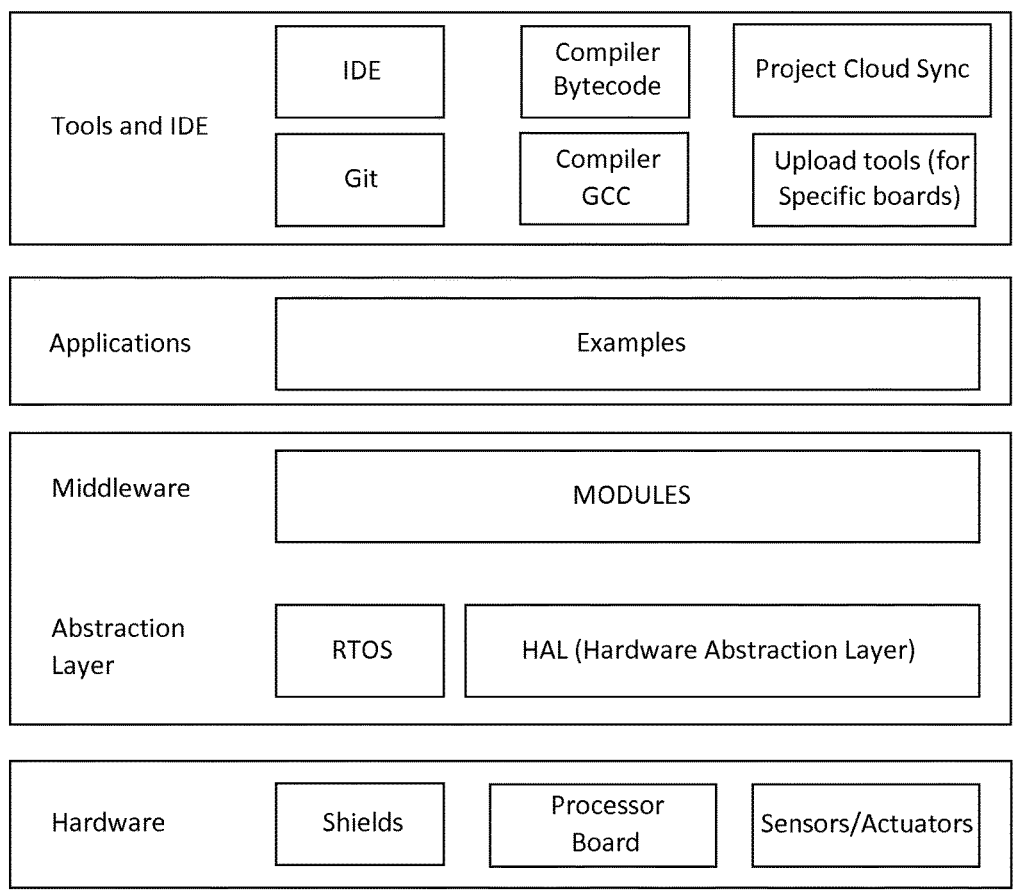
FIG. 1 shows the architecture of a system according to the status of the art.
Figure 2:
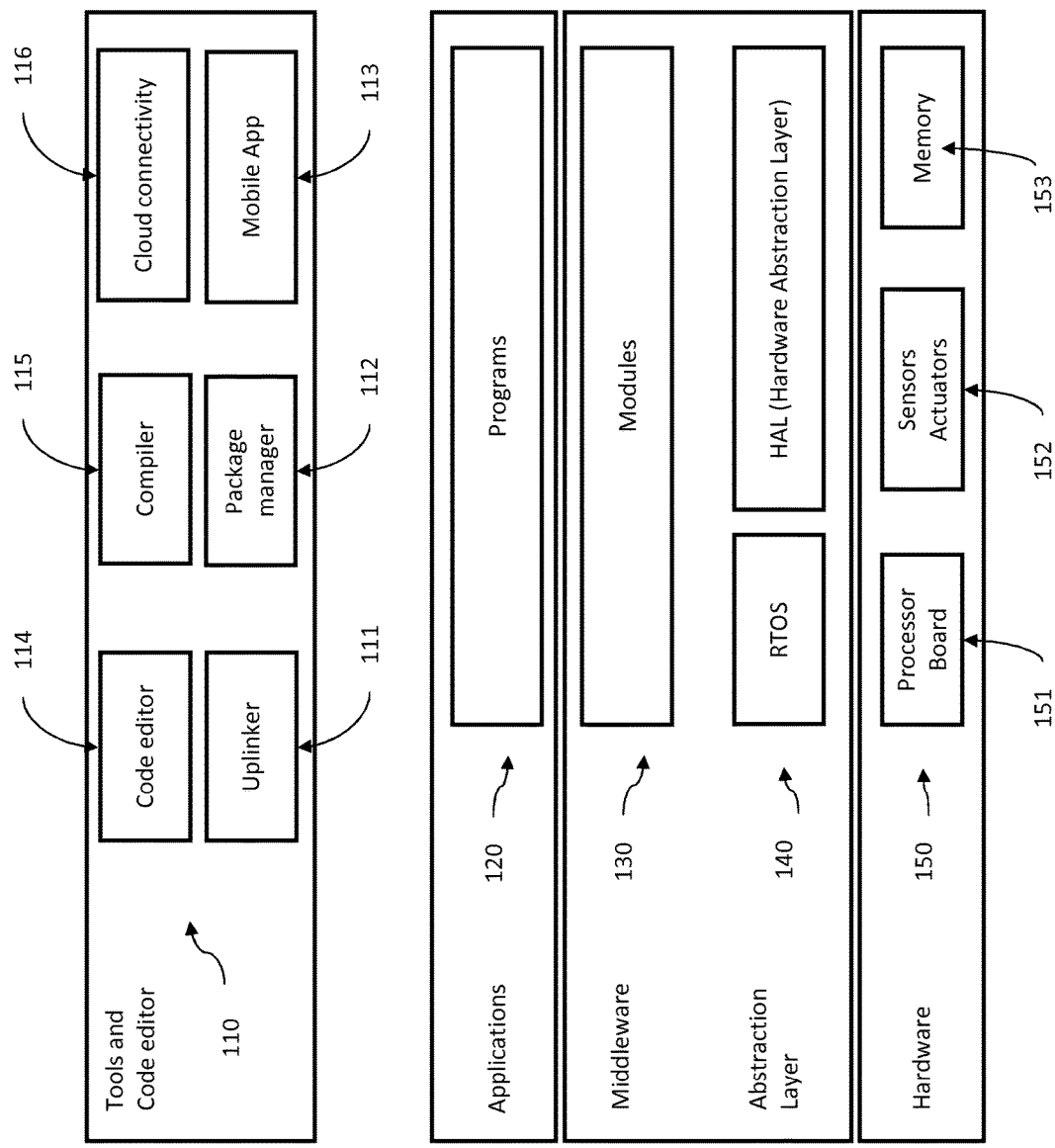
FIG. 2 shows a system according to embodiments herein.

With reference to FIG. 2, the architecture of a system according to an embodiment is now disclosed.

The architecture comprises a set of programming tools 110, an application program 120, a set of code modules 130 acting as a middleware between the application 120 and the low level code 140 implementing the multithreading mechanisms and the hardware abstraction layer, a hardware 150 represented by a board 151 with mcu/mpu capabilities installed together with a persistent memory 153 and possibly a set of sensors and actuators 152.

The set of programming tools 110 comprises a code editor 114 that enables the writing of programs. Such programs can be written in high level languages (e.g. Python) and optionally in low level languages (e.g. C) and are transformed in two stages: the first stage is performed by the compiler 115 that, given a program, converts it in a non executable low level code consisting of bytecode and optionally assembly code. Such non-executable low level code is then transformed again by the uplinker 111 in the second stage to obtain the final application code 120. The term uplinker is used in the present disclosure to identify a software/hardware module configured to transfer unlinked code to a program memory.

The set of programming tools is also composed of a mobile app 113 which is able to connect to devices programmed with a specific mobile-enabled application code 120 and to display a graphical user interface; moreover the mobile app 113 is able to establish a bidirectional connection with a device and exchange messages with it. The mobile app 113 features a mechanism for the discovery of devices programmed with a mobile-enabled application code.

The set of programming tools is completed by a module for cloud connectivity 116 that saves remotely both the development environment configuration and the programmer project files; and a package manager 112 for managing the extension of the set of programming tools with additional modules and components.

Figure 3:
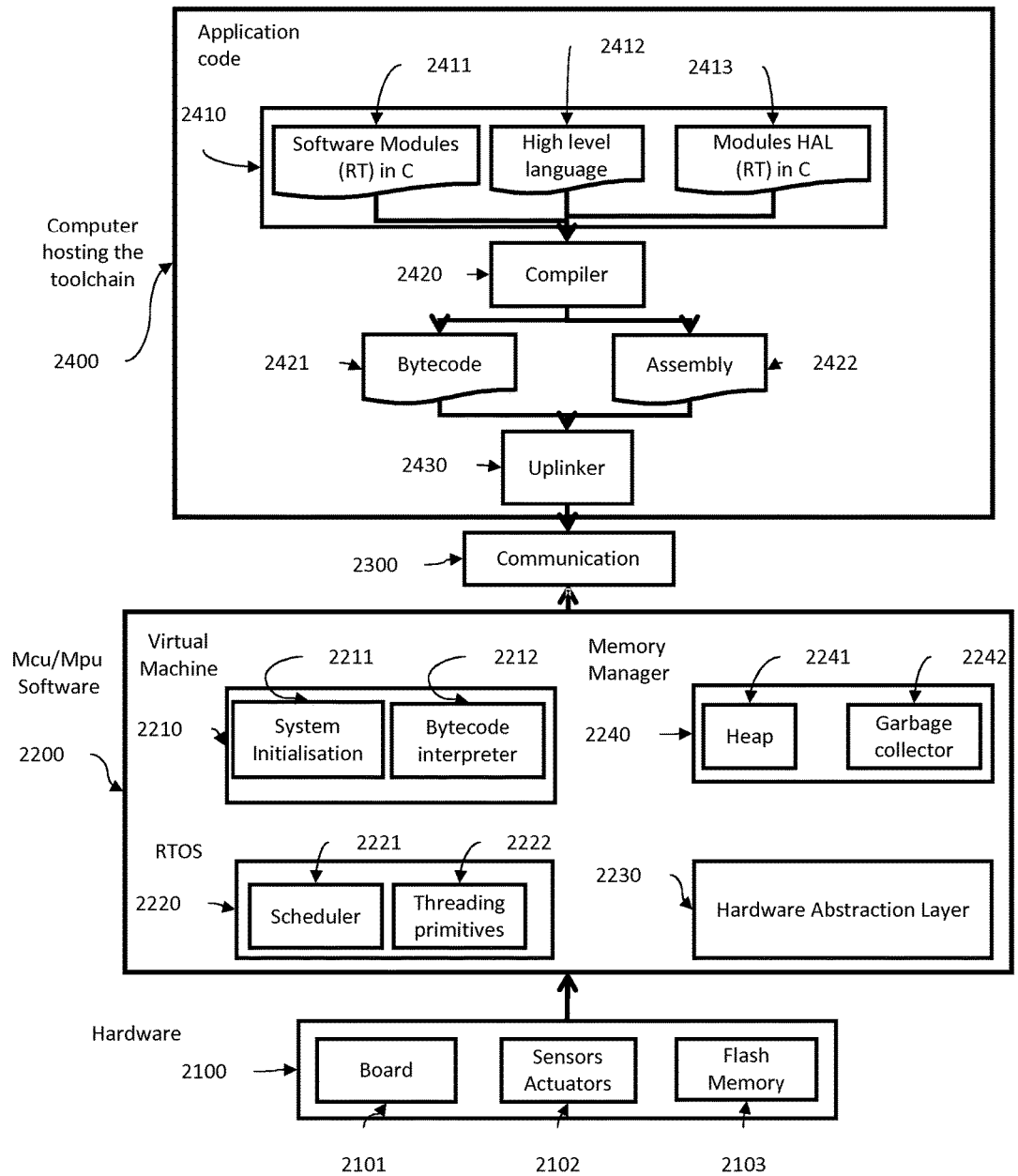
FIG. 3 illustrates functional components of a code transferring system according to embodiments herein.

FIG. 3 illustrates functional components of a code transferring system according to embodiments herein. The code transferring system comprises Hardware 2100, Software running on a mcu/mp 2200, a Computer system hosting the code transferring toolchain 2400 and a Communication 2300 between 2200 and 2400.

The Hardware 2100 may be composed of a Processor/Controller unit mounted on a Board 2101, Sensors and Actuators 2102 and a ROM Flash Memory 2103.

The Software running on a mcu/mpu 2200 comprises a Virtual Machine 2210, a RTOS 2220, a Memory Manager 2240 and a Hardware Abstraction Layer (HAL) 2230.

The Computer system hosting the code transferring toolchain 2400 is composed of an Application code 2410, a Compiler 2420 and an Uplinker 2430.

The Communication 2300 represents the interaction between the Computer 2400 and the Software 2200 running on Hardware 2100.

The Application code 2410 can be composed of Software Modules 2411 written in low level language (e.g. the C language), Modules implementing parts of the HAL 2413 written in low level language (e.g. the C language) and programs written in High Level Languages 2412 (e.g. Python).

The Compiler 2420 takes as input Software Modules 2411 and Modules implementing parts of the HAL 2413 producing Assembly code 2422; it also takes as input programs written in High Level Languages 2412 producing Bytecode 2421.

The Virtual Machine 2210 comprises a System Initialization 2211 and a Bytecode Interpreter 2212 while the RTOS 2220 comprises a Scheduler 2221 and Threading Primitives 2222 (e.g. Mutexes, Semaphores, etc.); The Memory Manager 2240 organizes RAM in a Heap 2241 managed by a Garbage Collector 2242. The Hardware Abstraction Layer (HAL) 2230 abstracts the hardware 2100

When a program is written in a high level language (such as Python or JavaScript) from which C functions are called, the computer interprets the high level language and turns it into bytecode or in a particular dialect that the virtual machine is able to interpret or, with regard to the C functions, they are directly converted into the assembler.

The compiler has a double task: in case of modules written in a high-level language, the system translates them into a "dialect" of the system and then into machine instructions. In the case of ARM assembly modules, ARM GCC compiler—ARM is directly used.

Assembler: translates the readable versions of the machine instructions into specific machine coding, ready for direct interpretation by the processor.

The system does not use a Linker but a different approach: the system uses an Uplinker which consists of an uploader and a table (base) that dynamically combines pieces of machine code together during the run time. This allows optimal use of memory: when the uplinker sends the code, the VM system (the kernel only), plus the integrated RTOS, then the HAL system, and finally all the software and hardware modules are loaded. Even in this case it can be either in byte code or in ARM assemble;

Actually the real time operating system and the core code of the VM occupy a determined memory space (almost constant), while the remaining flash space is gradually filled with the software modules and the hardware modules. When the Python or JavaScript or LUA script is ready and the board is configured, the uplinker statically calculates the size of all modules at compile phase, preparing the table with the start and end position and saves them in the flash while minimizing RAM usage.

The virtual machine is able to run in machine language code, not interpreted, obtained by compiling the intermediate level language (C/C++) and linked at the time of the upload in a manner comparable to the bytecode. In order to be executed by the virtual machine, the machine language code is subject to the following constraint: the functions that are called and not contained in it belong exclusively to the set of functions exposed by the core code of the VM. The architecture described in FIG. 2 is able to retrieve the board vendor ID and other information written permanently in the board of the chip. In this way, the system also allows to assign different names to all the connected boards, which are then recognized through the disambiguation of the IDs. To achieve this behaviour, the system generates a configuration file of board_cfg.xx type that is included in the project and used by the compiler to translate the names of the pins in accordance with the specific ID pin mapping.

Figure 4:
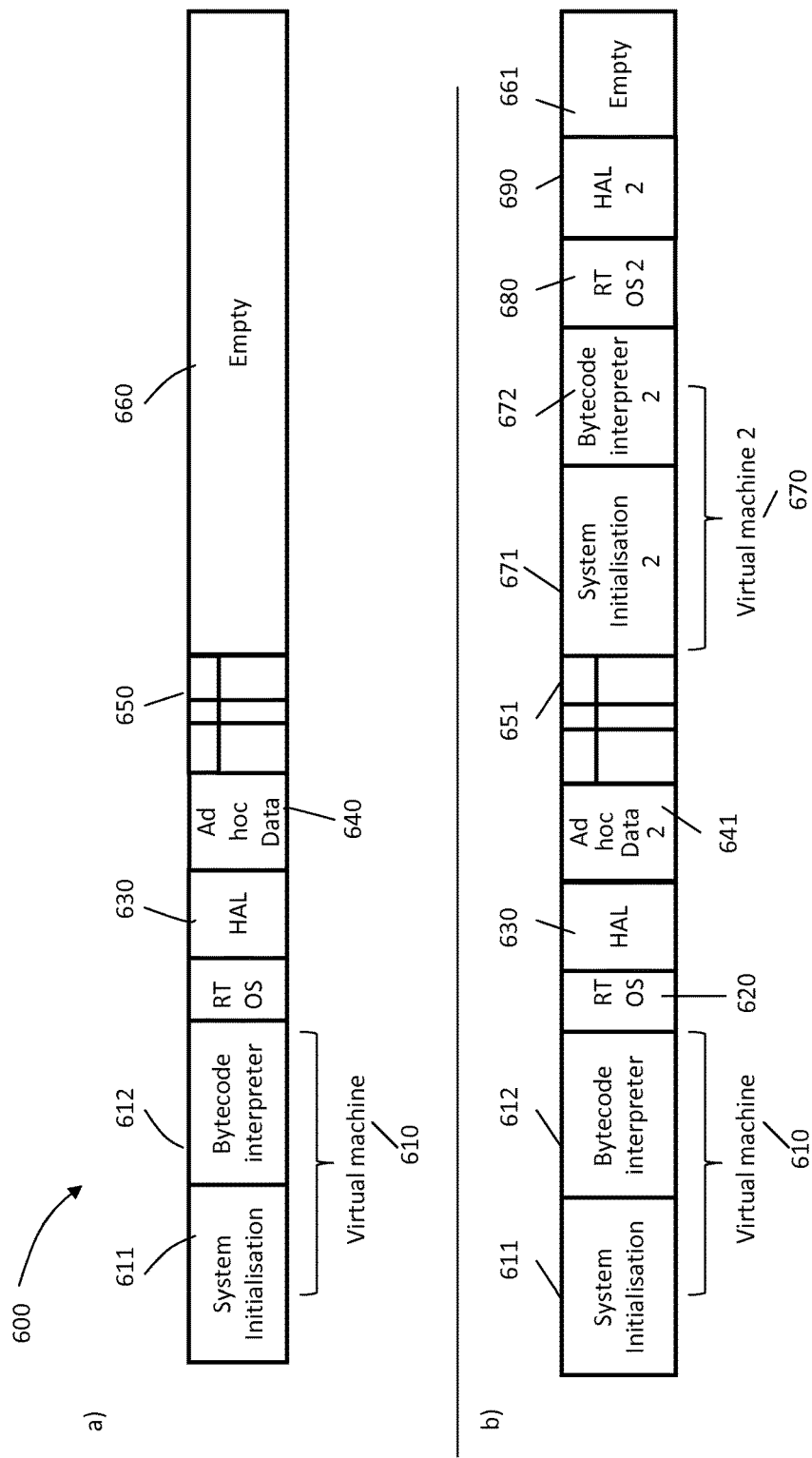
FIG. 4 shows two cases where the uplinker manages the flash memory according to different hardware and software requirements.

FIG. 4 shows two cases where the uplinker manages the flash memory according to the hardware and software requirements. Different RTOS can require different spaces, while the core system remains almost constant. The size of the System HAL depends on hardware features while the "ad hoc data" may vary. Hardware modules (drivers) and software modules are loaded only if included within the script. The two cases in FIG. 4 show two different situations that differ in the board, in the "ad hoc data" and in hardware modules (drivers of sensors or shield) and in the used software modules.

The layout of ROM image 600 is intended to group both VM code and Application code with all the necessary components within specific regions. The size of each region is dependent upon the code intended to reside within each region.

A region containing VM code 610 contains specific segments of code implementing different set of functionalities such as System Initialization segment 611, Bytecode Interpreter segment 612, RTOS segment 620, HAL segment 630 and an optional AdHocData segment 640. A region containing VM code is advantageously partitioned in such a way that the System Initialization segment 611 is the first to be executed.

A region containing Application code may contain specific segments of code and segments of data with a layout computed by the Uplinker 111.

System initialization is smartly achieved. When the mcu/mpu is powered, the first code to be executed is the System Initilization 611. In this phase the microcontroller is configured to optimally execute the bytecode interpreter 612. The configuration parameters are taken from the persistent memory segment called AdHocData 640. Among the configuration data stored in the AdHocData segment there are flags recording the status of the previous System initialization phase (OK or Failed) together with the address to jump to in order to continue execution after the System Initialization phase.

This mechanism allows to have multiple Virtual Machines 610, 670 hosted on the same board and to select one of them to be executed according to the AdHocData segment 640 parameters.

AdHocData segment parameters can be modified from Application code by calling specific VM function(s) (F0 in FIG. 5 (symbol table)). Moreover, a failsafe mechanism is included in the System Initialization phase: if the previous run failed for some reason (Fail flag in AdHocData), the control is passed to the last working VM. The ROM occupied by non currently running VMs can be deleted by the running VM and reused for its own purposes, provided that the System Initialization segments of the inactive VMs are left untouched.

A method for transferring code to a non-volatile memory image representing ROM of the device hosting a VM 610 involves establishing communication between a software component (Uplinker) running on the computer hosting the toolchain and the VM running on the device.

Figure 6:
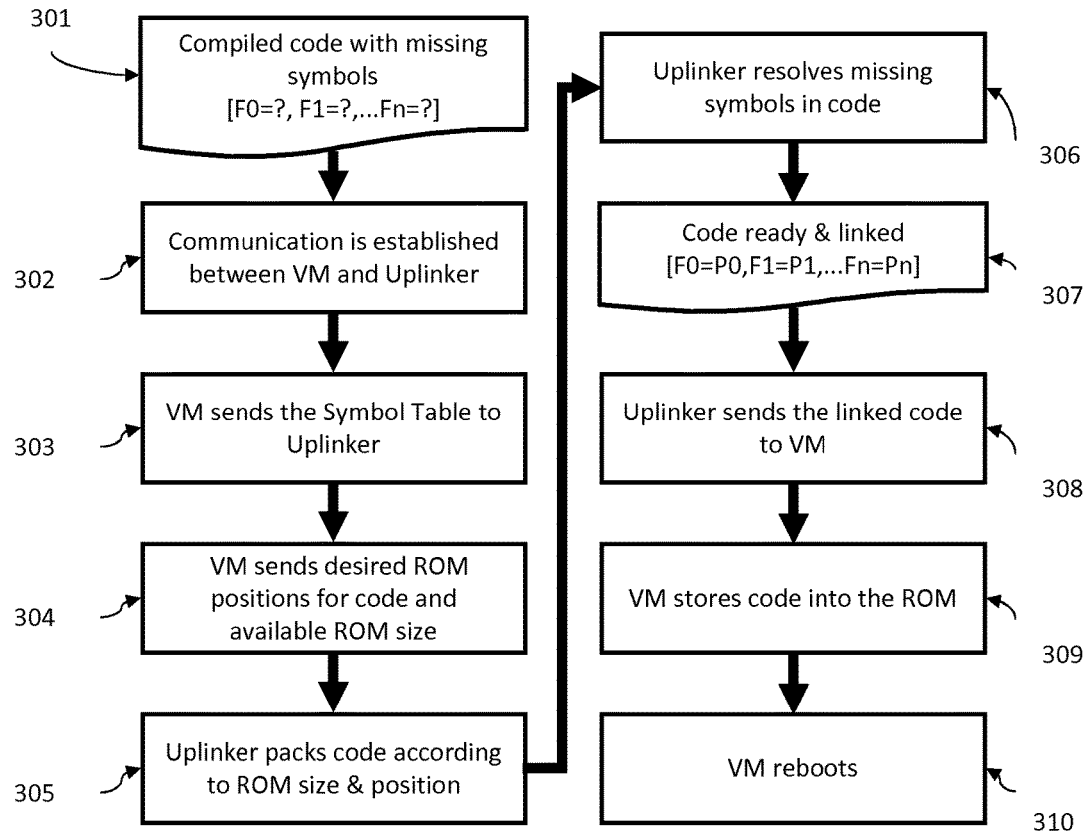
FIG. 6 shows the workflow of a process of transferring code by the uplinker to a non-volatile memory according to embodiments herein.

FIG. 6 is the uplinker workflow illustrating a process for transferring code to a non-volatile memory according to embodiments herein. The process includes operations 301-310. The order in which the process is described is not intended to be construed as a limitation. The operations are performed by the interplay of the Uplinker with the VM hosted on the device. Alternatively, the process 300 can be implemented in any suitable hardware, software, firmware, or combination thereof.

At 301, the uplinker loads the compiled code consisting of bytecode and (optionally) non-executable assembly code due to unresolved symbols. At 302, the Uplinker establishes communication with the target VM running on a device, by exchanging a message sequence over a transport layer, such sequence realizing a handshake step where compatibility between Uplinker and VM versions is checked. At 303, the VM sends to the Uplinker the Symbol Table (FIG. 4) containing the absolute addresses (P0,P1, . . . Pn) in the device ROM of segments of VM code representing the implementation of selected VM functions names (F0, F1, . . . Fn). At 304, the VM sends the available ROM size to host the application code and its desired starting position. At 305, the uplinker uses information received at 304 to create a single segment, space optimized image holding application code. At 306, the uplinker uses information gathered at 303 to resolve missing symbols in the application code, producing an executable code 307 statically linked to the particular VM it established communication with. Thanks to operation 306, the produced image is also optimized in terms of code execution time. Indeed, by statically resolving missing symbols at upload time (namely, substituting occurrences of Fn with the corresponding address Pn), the uplinker avoids the need for the VM to have a symbol resolution mechanism at runtime, making function calls for missing symbols as fast as possible (that usually amount to a single assembly instruction jumping to Pn). Without the uplinker, the produced application code would have contained unresolved symbols and the VM would have been forced to implement a mechanism of runtime resolution; for example, by translating the calling of function Fn to first the lookup of the position Pn for Fn in the symbol table and then a jump to Pn, at least doubling the number of instructions for a function call. At 308, the Uplinker sends produced code image to the VM which, at 309, stores the received image in to the ROM starting at the desired position communicated at 304. Finally, at 310, the VM triggers a reboot to transfer execution to the System Initialization that will eventually start a bytecode interpreter to execute the transferred application code.

Figure 7:
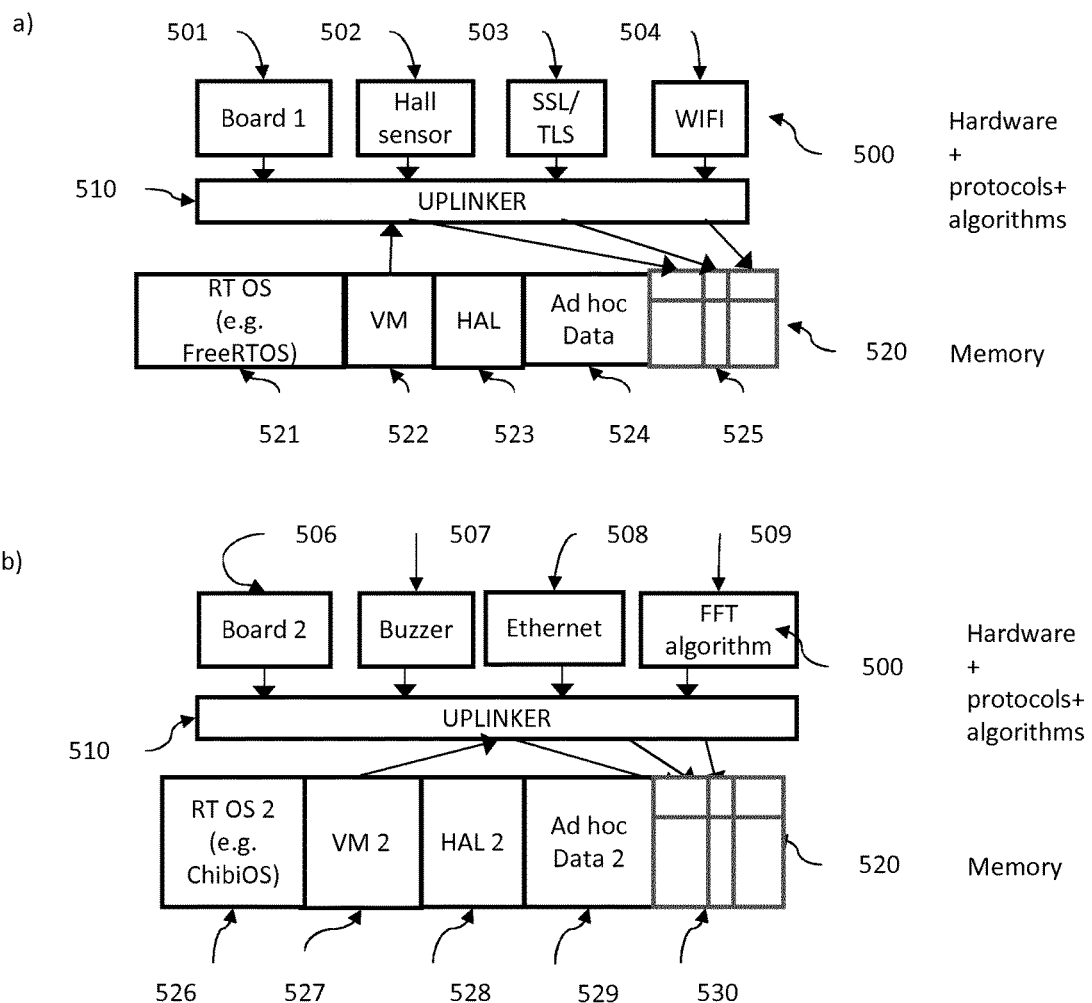
FIG. 7 shows two different cases where the uplinker organizes the flash memory according to two different architecture requirements.

FIG. 7 shows two different cases where the uplinker 510 organizes the flash memory 520 according to two different architecture requirements 500. In FIG. 7a the architecture requirements are exemplified by a specific Board 501 equipped with sensors 502 and a software stack comprising secure communication protocols 503 (possibly written in a low level language) over a wifi transport layer 504 (possibly written in a high level language). In this case the uplinker 510 produces an application code 525 that is able to use sensors in a hardware independent manner by calling functions of the HAL 523; the application code is able to run in a multithreaded environment in a RTOS independent manner by calling functions residing in the VM 522; such functions hides the implementation of multithreading of that particular RTOS 521 to the application code.

In FIG. 7b a different set of architecture requirements is shown: Board 506 equipped with a Buzzer actuator 507 and a software stack comprising ethernet transport layer 508 (possibly written in a low level language) and a Fast Fourier Transform Algorithm 509 (possibly written in a high level language).

As it can be noticed in FIG. 7b, a different RTOS can be chosen to adapt the VM performance to the architecture requirements.

Flash 520 can also be used to load html templates, json files, images, etc. and a method of data exposure related to the sensors and actuators and code in bidirectional mode (from micro to mobile and vice versa). When the object carrying the bytecode generated by the development environment is recognized by a mobile device via wifi, bluetooth, zigbee, etc then the MOBILE APP 10 (FIG. 2), that is included in the architecture that is located on the mobile device, connects for example in secure mode using SSL/TSL 503 with the object and becomes the object interface according to the data display method, the template and the images. The MOBILE APP is generic, i.e. the user will download a version that allows him to make discovery of objects programmed with the architecture described in FIG. 2 and connect to them. They will expose different interfaces based on the information loaded into the flash memory. This allows a reduction in the development time of the Mobile App. Also the fact that the template, images etc. are located within the object's memory allows an interface between object and APP even without internet connection, and through the use of other types of connection.

The subject matter is described with specificity to meet statutory. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

The invention claimed is:

1. A computer-implemented method for defining a code to be executed by programmable control devices comprising:
    having a programming language;
    having a code written by using said programming language, the code comprising at least one module;
    compiling the code by using the machine language;
    transferring said machine language code onto a program memory to be executed by the control device,
    wherein said machine language code is divided into a core code and an application code, said application code being loaded into the program memory independently of the core code without performing an operation of linking of the two codes before said transfer and according to an allocation table built after the compilation phase, said table comprising the size, and start location and end location of each module forming the code.

2. Method according to claim 1, wherein the application code is divided into modules, being possible to replace each module with another module according to information included within the allocation table without having to reload the remaining modules.

3. A computer-implemented method for defining a code to be executed by programmable control devices comprising:
    having a high-level programming language;
    having one or more scripts written in that programming language;
    compiling said scripts to generate a bytecode;
    having a virtual machine capable of interpreting bytecode;
    providing specific low-level codes for the control device and its peripheral devices, said low-level codes being the core code and said virtual machine being configured to run a core code;
    having a real-time operating system;
    building, after the compilation phase, a memory allocation table in which locations of the scripts in bytecode format are assigned;
    loading the core code and the bytecode in the program memory for their execution by the control device,
    wherein the bytecodes comprise a core and an application code, said application code being loaded into the program memory independently of the core code without performing an operation of linking of the two codes before said transfer and according to the information included in the memory allocation table.

4. Method according to claim 3, wherein the virtual machine is able to execute said machine language code, not interpreted, obtained by compiling of the intermediate-level language loaded in the program memory independently of the core code according to the information included in the memory allocation table.

5. Method according to claim 3, wherein the high-level programming language is Python, Javascript, LUA or Ruby.

6. Method according to claim 3, wherein the application code loaded in the memory includes a html template or a json file that indicate a data format gathered through a board in which a micro control device is located, the board interfaceable with a mobile device via a wireless connection like WiFi, Bluetooth, or Zigbee, said mobile device being configured to run a generic application that recognizes the board and read from the memory the data format thus becoming an interface having functions according to said data format.

7. Method according to claim 6, wherein the interface between the mobile device and the board is performed without any connection to the Internet.

8. Method according to claim 6, wherein before the compilation phase, the reading of the data regarding the board is performed and said data are codified in a configuration file in and through each board.

9. Method according to claim 3, wherein the allocation table is based on information communicated by the control device executing the core code before the bytecode is transferred to the program memory.

10. Method according to claim 3, wherein the bytecode is loaded into memory at locations communicated by the control device while executing the core code.

11. A computer-implemented system for transferring a compiled application code and / or a core code to a memory for being executed by a programmable control device, the system comprising:
a virtual machine hosted by the device to run a core code loaded into the memory independently of the application code;
an uplinker component for transferring the application code into the memory of the device independently of the core code and without performing an operation of linking of the two codes;
a communication link between the virtual machine and the uplinker;
wherein the virtual machine is configured to:
send the uplinker a symbol table and desired memory size and position for the application code;
receive from the uplinker the code to be stored;
store the code as received in the memory,
the uplinker being configured to:
resolve missing symbols by static linking based on the symbol table received from the virtual machine;
pack the application code according to memory size and position as communicated by the virtual machine;
send the application code to the virtual machine for being stored in the memory the application code being adapted to be executed without any performance penalty due to the absence of dynamic linking.

12. System according to claim 11, wherein two or more virtual machines are hosted, the programmable control device being configured to run a system initialization code reading configuration parameters stored in a persistent memory to choose one of the virtual machines to be executed based on such parameters.

13. System according to claim 12, wherein configuration parameters contain indications of a run failure and on the virtual machine working before the run failure, the control device being configured to choose such working machine to be executed upon system initialization.

14. A control system comprising:
a programmable control device;
a configurable memory device containing software that, when executed by the control device, causes the software in the memory to be at least partially overwritten by a software received from an uplinker component configured to transfer only those parts of the software needed for a specific application with symbols resolved based on information exchanged between the control device and the uplinker component, wherein said software comprises a complied application code and/or a core code and said uplinker component is further configured to transfer the application code into the memory of the device independently of the core code and without performing an operation of linking of the two codes.

* * * * *